US010343526B2

(12) United States Patent
Ahiko et al.

(10) Patent No.: US 10,343,526 B2
(45) Date of Patent: Jul. 9, 2019

(54) COLLECTED-CURRENT MONITORING DEVICE

(71) Applicant: CENTRAL JAPAN RAILWAY COMPANY, Nagoya-shi, Aichi (JP)

(72) Inventors: Yuichi Ahiko, Nagoya (JP); Kotaro Nakamura, Nagoya (JP); Hiroki Shimoyama, Nagoya (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 0 days.

(21) Appl. No.: 15/771,673

(22) PCT Filed: Nov. 1, 2016

(86) PCT No.: PCT/JP2016/082449
§ 371 (c)(1),
(2) Date: Apr. 27, 2018

(87) PCT Pub. No.: WO2017/078017
PCT Pub. Date: May 11, 2017

(65) Prior Publication Data
US 2018/0312064 A1    Nov. 1, 2018

(30) Foreign Application Priority Data

Nov. 2, 2015  (JP) ................. 2015-215956

(51) Int. Cl.
*B60L 5/38* (2006.01)
*B60L 3/00* (2019.01)
*B60L 3/12* (2006.01)
*G05B 23/02* (2006.01)

(52) U.S. Cl.
CPC ................... *B60L 5/38* (2013.01);
*B60L 3/00* (2013.01); *B60L 3/12* (2013.01);
*B60L 2200/26* (2013.01); *G05B 23/024* (2013.01)

(58) Field of Classification Search
CPC ...... B60L 5/00; B60L 5/38; B60L 5/39; B60L 3/00; B60L 3/0069; B60L 3/12;
(Continued)

(56) References Cited

U.S. PATENT DOCUMENTS 3,447,034 A * 5/1969 Smith ............... G01P 1/103
324/161
8,624,559 B2 * 1/2014 Syed ............... H01M 10/48
320/162

(Continued)

FOREIGN PATENT DOCUMENTS

CN    105453374 A    3/2016
EP     3032690 A1    6/2015
(Continued)

OTHER PUBLICATIONS

International Search Report for International Application No. PCT/JP2016/082449; dated Jan. 24, 2017.
(Continued)

*Primary Examiner* — Van T Trieu
(74) *Attorney, Agent, or Firm* — Ferguson Case Orr Paterson

(57) ABSTRACT

A collected-current monitoring device includes a current-value obtaining unit for obtaining current values I1 and I2; a first RMS-calculation unit for calculating a root mean square (RMS) 1 of the current value I1 at a window width W; a second RMS-calculation unit for calculating a root mean square (RMS) 2 of the current value I2 at the window width W; a determining unit for determining whether a combination of the RMS 1 and the RMS 2 satisfies an abnormality condition; an abnormality-signal output unit for outputting an abnormality signal when the abnormality condition is satisfied; an information-obtaining unit for obtaining railway vehicle information; and a setting unit for setting a set-parameter that includes at least one of the
(Continued)

window width W or the abnormality condition depending on the railway vehicle information.

10 Claims, 8 Drawing Sheets

(58) Field of Classification Search
CPC ... B60L 2200/26; B60W 10/00; B60W 10/08; B60W 10/10
See application file for complete search history.

(56) References Cited

U.S. PATENT DOCUMENTS

| | | | |
|---|---|---|---|
| 10,160,342 B2 * | 12/2018 | Baraszu | B60L 58/21 |
| 2016/0185248 A1 | 6/2016 | Aoshima et al. | |

FOREIGN PATENT DOCUMENTS

| | | |
|---|---|---|
| JP | H06122335 A | 5/1994 |
| JP | 10248109 A | 9/1998 |
| JP | 2003/319505 A | 11/2003 |
| JP | 4386253 B | 9/2004 |
| MX | 2016001574 A | 5/2016 |
| WO | WO 2015/019873 A1 | 2/2015 |

OTHER PUBLICATIONS

International Preliminary Report for Application No. PCT/JP2016/082449; dated May 17, 2018.

* cited by examiner

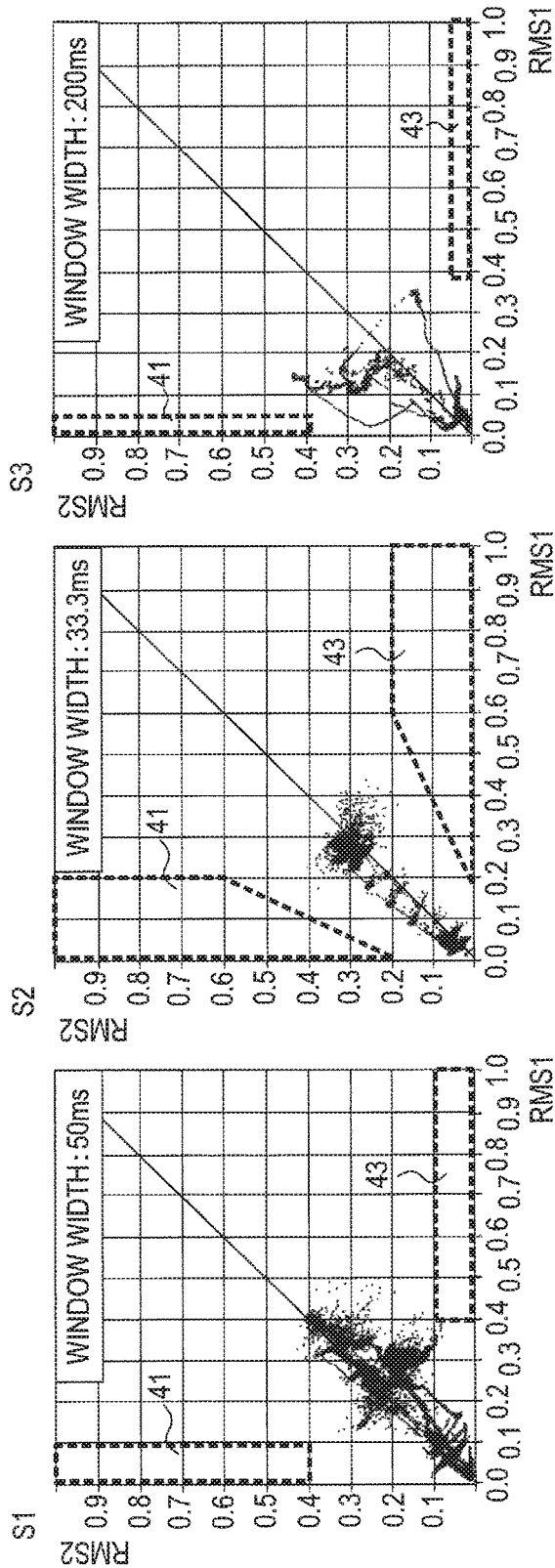

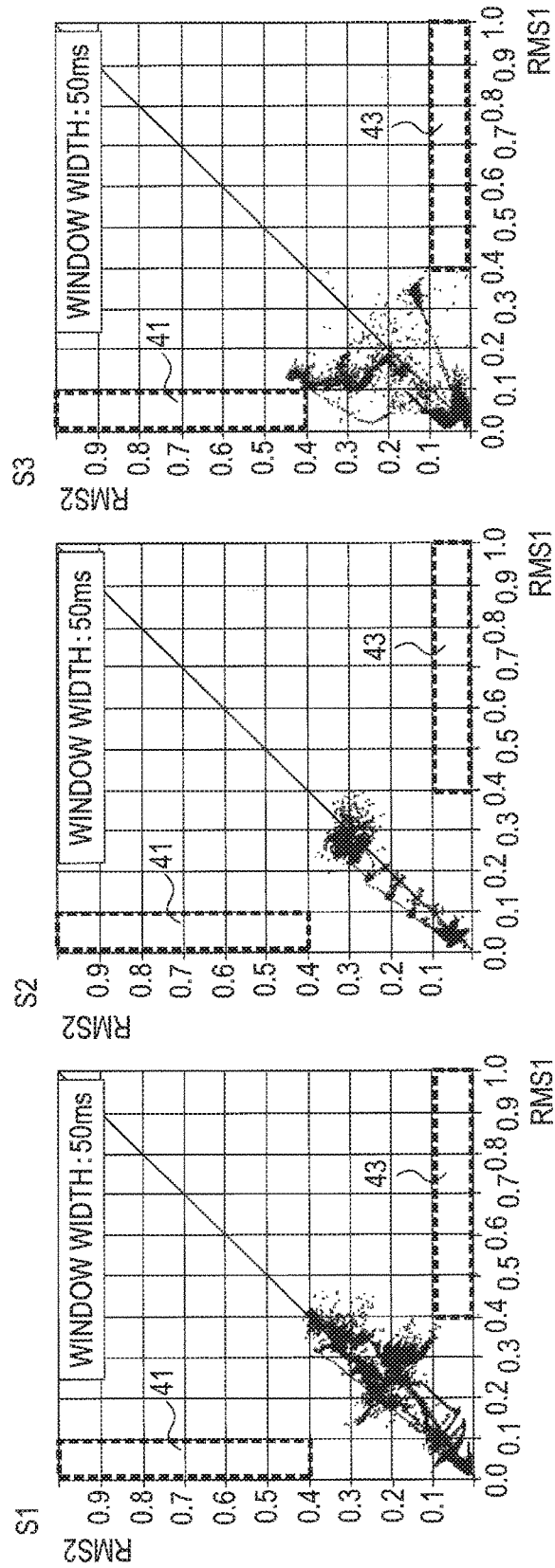

COLLECTED-CURRENT MONITORING DEVICE

CROSS-REFERENCE TO RELATED APPLICATION

This is a national phase application of International Patent Application No. PCT/JP2016/082449, filed on Nov. 1, 2016, which claims the benefit of Japanese Patent Application No. 2015-215956 filed Nov. 2, 2015 in the Japan Patent Office. The disclosure of each application cited in this paragraph is explicitly incorporated by reference as if set forth fully herein.

TECHNICAL FIELD

The present disclosure relates to a collected-current monitoring device.

BACKGROUND ART

A railway vehicle comprises a current collector mounted on its roof. The current collector comprises a collector shoe supported by a collector arm. The collector shoe comprises a shoe body, and a slider attached to a top surface of the shoe body. The current collector collects electric current by pressing the slider of the collector shoe against an underside of an overhead wire and delivers the collected current from the overhead wire to the railway vehicle (see Patent Document 1).

PRIOR ART DOCUMENTS

Patent Documents

Patent Document 1: Japanese Patent No. 4386253

SUMMARY OF THE INVENTION

Problems to be Solved by the Invention

When one of current collectors mounted on a railway vehicle is unable to collect electric current, such a situation is called contact loss. The contact loss occasionally occurs on a current collector that is mounted on a front side of the railway vehicle in a running direction of the railway vehicle when an overhead wire is frozen or frosted. Nevertheless, since the ice or frost on the overhead wire is removed by the current collector on the front side of the railway vehicle in the running direction, current collectors on a rear side of the railway vehicle can usually collect electric current.

If another current collector experiences the contact loss due to some reasons when one current collector is experiencing the contact loss, it causes an electric arc and damages the shoe body. The electric arc is likely to occur when the contact loss is occurring; thus, it is necessary to detect the contact loss.

However, when the contact loss is occurring, one corresponding current collector has an instant wave profile of the collected current that is the same as the normal wave profile. Hence the contact loss cannot be detected from the instant wave profile of the collected current of the corresponding current collector.

Preferably, one aspect of the present disclosure provides a collected-current monitoring device that enables detection of the contact loss.

Means for Solving the Problems

One aspect of the present disclosure comprises a current-value obtaining unit configured to obtain a current value I1 of collected current flowing through a first current collector, and a current value I2 of collected current flowing through a second current collector; a first RMS-calculation unit configured to calculate a root mean square (RMS) 1 of the current value I1 at a window width W; a second RMS-calculation unit configured to calculate a root mean square (RMS) 2 of the current value I2 at the window width W; a determining unit configured to determine whether a combination of the root mean square (RMS) 1 and the root mean square (RMS) 2 satisfies an abnormality condition; an abnormality-signal output unit configured to output an abnormality signal when the determining unit determines that the abnormality condition is satisfied; an information-obtaining unit configured to obtain railway vehicle information including at least one of a position or a speed of a railway vehicle that comprises the first current collector and the second current collector; and a setting unit configured to set a set-parameter that includes at least one of the window width W or the abnormality condition depending on the railway vehicle information obtained by the information-obtaining unit.

The collected-current monitoring device in one aspect of the present disclosure determines whether a combination of the root mean square (RMS) 1 and the root mean square (RMS) 2 satisfies the abnormality condition. The abnormality condition may be defined such that the abnormality condition is satisfied when the root mean square (RMS) 1 and the root mean square (RMS) 2 are unequal (which is when contact loss is occurring). Thus, a collected-current monitoring device in one aspect of the present disclosure is able to determine whether the contact loss is occurring.

The collected-current monitoring device in one aspect of the present disclosure sets the set-parameter depending on the railway vehicle information. Thus, the collected-current monitoring device in one aspect of the present disclosure is able to optimize the set-parameter depending on the railway vehicle information. Consequently, false detection of the contact loss can be reduced while improving sensitivity of detecting the contact loss.

BRIEF DESCRIPTION OF THE DRAWINGS

FIG. 7A is an explanatory diagram showing a root mean square (RMS) 1 and a root mean square (RMS 2) calculated by the collected-current monitoring device 1 in a section S1, as well as set abnormal regions 41 and 43.

FIG. 7B is an explanatory diagram showing a root mean square (RMS) 1 and a root mean square (RMS) 2 calculated by the collected-current monitoring device 1 in a section S2, as well as set abnormal regions 41 and 43.

FIG. 7C is an explanatory diagram showing a root mean square (RMS) 1 and a root mean square (RMS) 2 calculated by the collected-current monitoring device 1 in a section S3, as well as set abnormal regions 41 and 43.

FIG. 8A is an explanatory diagram showing a root mean square (RMS) 1 and a root mean square (RMS) 2 calculated in the section S1 with the window width W fixed, as well as fixed abnormal regions 41 and 43.

FIG. 8B is an explanatory diagram showing a root mean square (RMS) 1 and a root mean square (RMS) 2 calculated in the section S2 with the window width W fixed, as well as the fixed abnormal regions 41 and 43.

FIG. 8C is an explanatory diagram showing a root mean square (RMS) 1 and a root mean square (RMS) 2 calculated in the section S3 with the window width W fixed, as well as the fixed abnormal regions 41 and 43.

EXPLANATION OF REFERENCE NUMERALS

1 . . . collected-current monitoring device, 3 . . . CPU, 5 . . . memory, 7 . . . current-value obtaining unit, 9 . . . first RMS-calculation unit, 11 . . . second RMS-calculation unit, 13 . . . determining unit, 15 . . . abnormality-signal output unit, 17 . . . information-obtaining unit, 19 . . . setting unit, 21 . . . speed sensor, 23 . . . ground transponder, 25 . . . ATC, 27 . . . first current collector, 29 . . . second current collector, 31 . . . first current-sensor, 33 . . . second current-sensor, 35 . . . control-transmitter, 37 . . . monitor, 39 . . . main converter, 41, 43 . . . abnormal region.

MODE FOR CARRYING OUT THE INVENTION

Embodiments of the present disclosure will be explained hereinafter with reference to the drawings.

First Embodiment

1. Configuration of Collected-Current Monitoring Device 1

Figure 1:
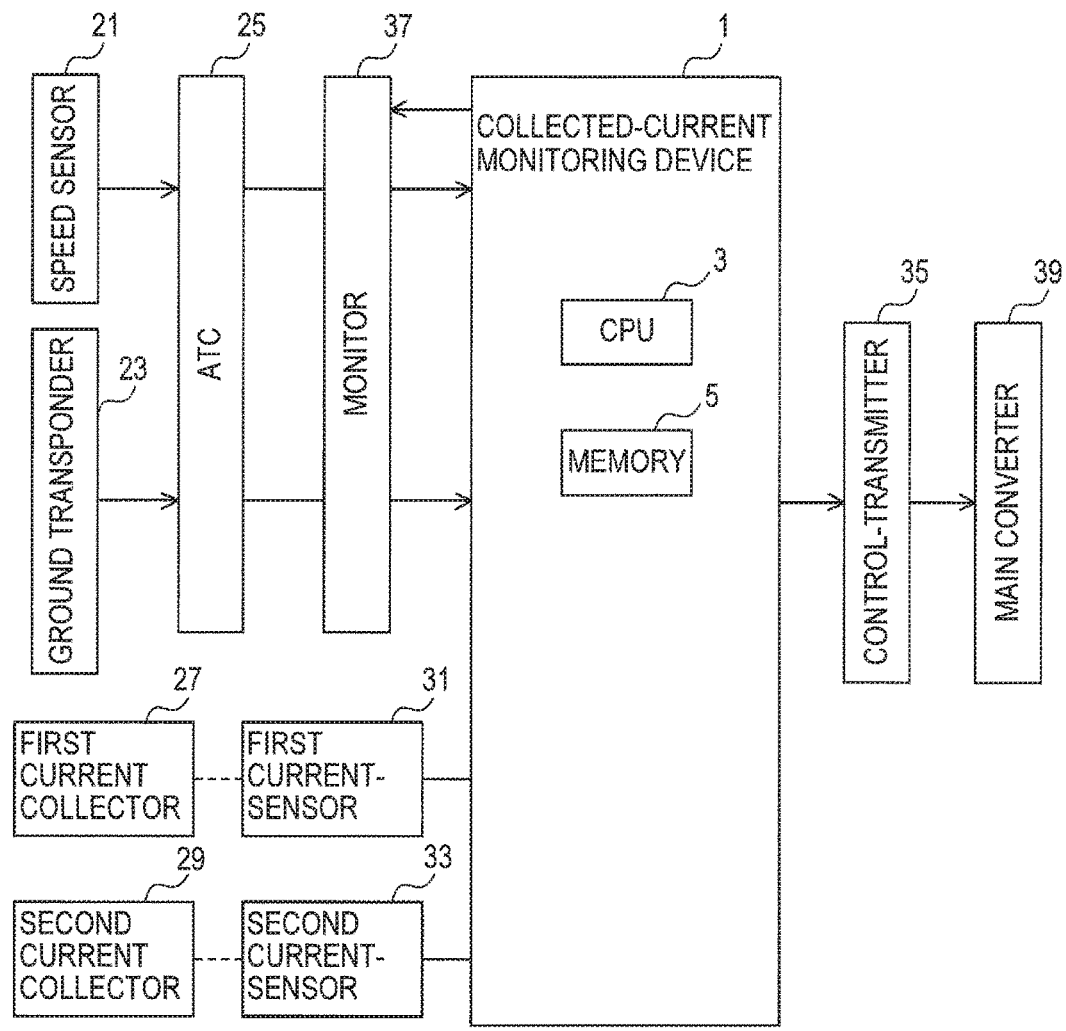
FIG. 1 is a block diagram showing configuration of a collected-current monitoring device and other devices.

Configuration of a collected-current monitoring device 1 will be explained with reference to FIG. 1 and FIG. 2. The collected-current monitoring device 1 is mounted on a railway vehicle. As shown in FIG. 1, the collected-current monitoring device 1 mainly comprises a well-known microcomputer including a CPU 3, and a memory 5. The memory 5 may be, for example, a semiconductor memory such as a RAM, a ROM, and a flash memory. Functions of the collected-current monitoring device 1 are enabled by the CPU 3 running programs stored in the memory 5.

Figure 2:
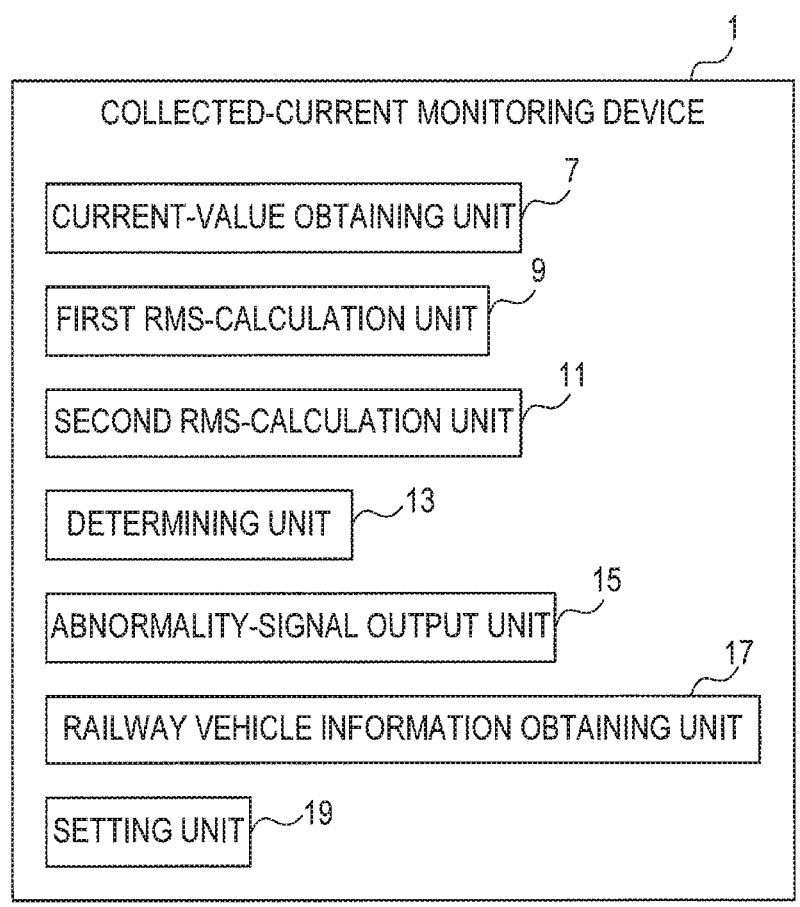
FIG. 2 is a block diagram showing functional configuration of the collected-current monitoring device.
Figure 3:
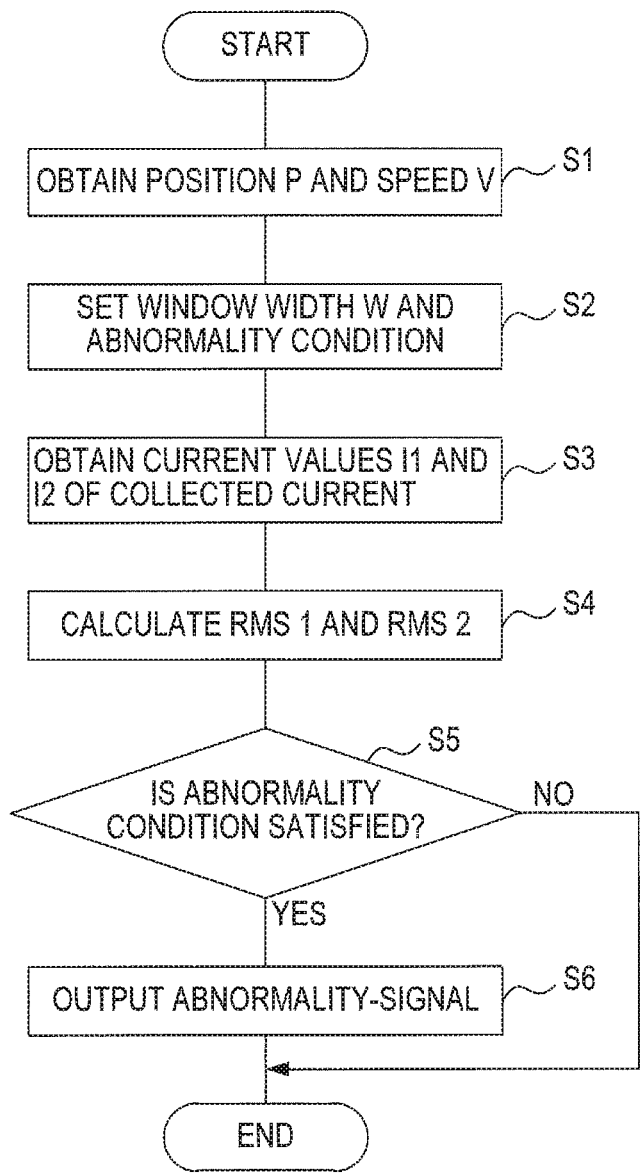
FIG. 3 is a flowchart showing a process enabled by the collected-current monitoring device.

As those functions enabled by the CPU 3 running the programs, the collected-current monitoring device 1 comprises a current-value obtaining unit 7, a first RMS-calculation unit 9, a second RMS-calculation unit 11, a determining unit 13, an abnormality-signal output unit 15, an information-obtaining unit 17, and a setting unit 19 as shown in FIG. 2.

In addition to the collected-current monitoring device 1, the railway vehicle comprises a speed sensor 21, a ground transponder 23, an ATC (automatic train control) 25, a first current collector 27, a second current collector 29, a first current-sensor 31, a second current-sensor 33, a control-transmitter 35, a monitor 37, and a main converter 39.

The speed sensor 21 detects a speed v of the railway vehicle and transmits the detected speed v to the ATC 25. The ATC 25 integrates the speed v by time and constantly estimates a position P of the railway vehicle. The ground transponder 23 transmits information for positioning correction to the ATC 25. The information for positioning correction is a precise positional information of the railway vehicle. The ATC 25 uses the information for positioning correction to properly correct the position P that is estimated as explained above. The ATC 25 transmits the speed v and the position P to the collected-current monitoring device 1 via the monitor 37. The speed v and the position P correspond to the railway vehicle information. The monitor 37 displays the speed v and the position P.

The first current-sensor 31 detects a current value I1 of collected current that flows through the first current collector 27 and transmits the detected current value I1 to the collected-current monitoring device 1. The second current-sensor 33 detects a current value I2 of collected current that flows through the second current collector 29 and transmits the detected current value I2 to the collected-current monitoring device 1. The first current collector 27 is mounted on an $n^{th}$ car of the railway vehicle; the second current collector 29 is mounted on an $m^{th}$ car of the railway vehicle. Note that n and m are both natural numbers from 1 to 16, where n is smaller than m.

The monitor 37 and the control-transmitter 35 receive an abnormality signal that the collected-current monitoring device 1 outputs. The abnormality signal will be explained later. In response to receiving the abnormality signal, the control-transmitter 35 transmits the abnormality signal to the main converter 39. The monitor 37 is located at a driver's seat. A driver of the railway vehicle can watch a displayed image on the monitor 37. In response to receiving the abnormality signal, the monitor 37 displays an abnormality-notification image. The abnormality-notification image is a unique image displayed when the abnormality signal is received. The main converter 39 enables notch control in response to receiving the abnormality signal. The notch control is for controlling the speed or acceleration of the railway vehicle.

2. Process Executed by Collected-Current Monitoring Device 1

Process repeated by the collected-current monitoring device 1 every predefined time interval will be explained with reference to FIG. 3 to FIG. 6. In Step 1 in FIG. 3, the information-obtaining unit 17 obtains the position P and the speed v from the ATC 25.

Figure 4:
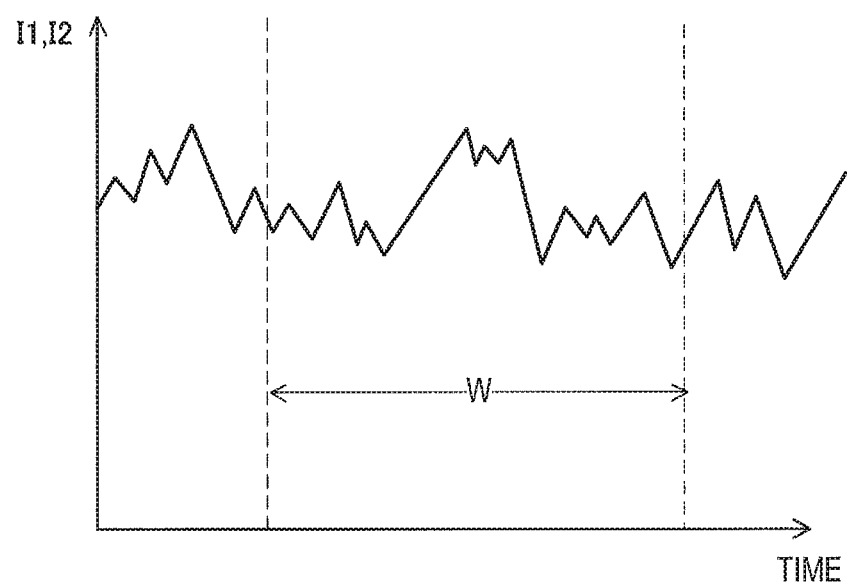
FIG. 4 is an explanatory diagram showing a window width W.

In Step 2, the setting unit 19 sets a window width W and an abnormality condition depending on the position P and the speed v obtained in Step 1. As shown in FIG. 4, the window width W is the length of interval, the integral of which is used to calculate root mean square (RMS) 1 and root mean square (RMS) 2 in Step 4, which will be mentioned later. The unit of the window width W is msec. The window width W corresponds to a set-parameter. The greater the window width W is, the less likely a combination of the root mean square (RMS) 1 and the root mean square (RMS) 2 satisfy the abnormality condition in Step 5, which will be mentioned later.

Figure 5:
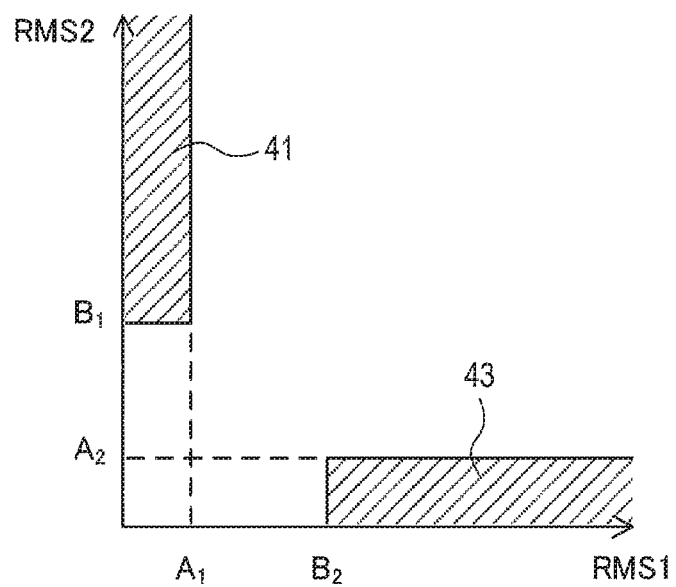
FIG. 5 is an explanatory diagram showing an abnormality condition.

The abnormality condition is that a combination of the root mean square (RMS) 1 and the root mean square (RMS) 2 is within an abnormal region 41 or an abnormal region 43 shown in FIG. 5. FIG. 5 shows a two-dimensional space provided with a horizontal axis representing the size of the root mean square (RMS) 1, and a vertical axis representing the size of the root mean square (RMS) 2.

In the two-dimensional space in FIG. 5, the abnormal region 41 is defined by the root mean square (RMS) 1 being equal to or less than a threshold value $A_1$, and the root mean square (RMS) 2 being equal to or greater than a threshold value $B_1$. The abnormal region 43 is defined by the root mean square (RMS) 1 being equal to or greater than a threshold value $B_2$, and the root mean square (RMS) 2 being equal to or less than a threshold value $A_2$.

The abnormality condition is satisfied when the root mean square (RMS) 1 is equal to or less than the threshold value $A_1$, and the root mean square (RMS) 2 is equal to or greater than the threshold value $B_1$.

The abnormality condition is also satisfied when the root mean square (RMS) 1 is equal to or greater than the threshold value $B_2$, and the root mean square (RMS) 2 is equal to or less than the threshold value $A_2$.

The threshold values $A_1$, $A_2$, $B_1$, and $B_2$ are all positive values. The threshold value $B_1$ is greater than the threshold values $A_1$ and $A_2$. The threshold value $B_2$ is greater than the threshold values $A_1$ and $A_2$. The threshold value $A_1$ and the threshold value $A_2$ may be the same as or different from each other. The threshold value $B_1$ and the threshold value $B_2$ may be the same as or different from each other. The abnormality condition corresponds to the set-parameter.

Figure 6:
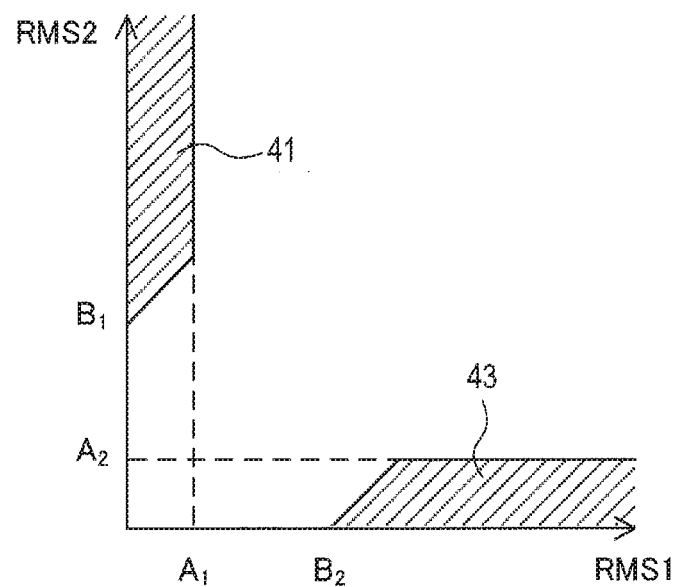
FIG. 6 is an explanatory diagram showing an abnormality condition.

In the two-dimensional space defined by the horizontal axis representing the size of the root mean square (RMS) 1 and the vertical axis representing the size of the root mean square (RMS) 2, the abnormal regions 41 and 43 may have a shape other than rectangles as shown in FIG. 6.

The harder the abnormality condition is (that is, the narrower the abnormal regions 41 and 43 are), the less likely the combination of the root mean square (RMS) 1 and the root mean square (RMS) 2 satisfies the abnormality condition in Step 5.

The setting unit 19 comprises, in advance, a correspondence table that defines a correspondence between <the position P and the speed v> and <the window width W and the abnormality condition>. The setting unit 19 uses the table to set the window width W and the abnormality condition that correspond to the position P and the speed v obtained in Step 1. The aforementioned correspondence in the table is rewritable.

The range of the window width W in the table is, for example, from 10 msec to 1000 msec. The table can be created, for example, by first creating a base table and then repeating a cycle of using the base table, assessing the result of the use, and revising the base table based on the assessment result. Preferably, at least one of the window width W or the abnormality condition in the table varies depending on the position P and the speed v.

If the abnormality condition is as shown in FIG. 5, then the abnormality condition is defined based on the threshold values $A_1$, $A_2$, $B_1$, and $B_2$ as described above. Thus, setting the abnormality condition by the setting unit 19 is equivalent to setting one or more of the threshold values $A_1$, $A_2$, $B_1$, or $B_2$.

In Step 3, the current-value obtaining unit 7 uses the first current-sensor 31 to obtain the first current value I1 and uses the second current-sensor 33 to obtain the second current value I2.

In Step 4, the first RMS-calculation unit 9 calculates the root mean square (RMS) 1 of the first current value I1, which was obtained in Step 3, at the window width W. The window width W used in this calculation is the window width W that was set in Step 2.

In this Step 4, the second RMS-calculation unit 11 calculates the root mean square (RMS) 2 of the second current value I2, which was obtained in Step 3, at the window width W. The window width W used in this calculation is the window width W that was set in Step 2.

In Step 5, the determining unit 13 determines whether the combination of the root mean square (RMS) 1 and the root mean square (RMS) 2 calculated in Step 4 satisfies the abnormality condition. More specifically, the determining unit 13 determines whether the combination of the root mean square (RMS) 1 and the root mean square (RMS) 2 calculated in Step 4 belongs to either one of the abnormal regions 41 and 43 shown in FIG. 5 or the abnormal regions 41 and 43 shown in FIG. 6. The abnormality condition used in this step was set in Step 2.

If the determining unit 13 determines that the abnormality condition is satisfied, then the process proceeds to Step 6. If the determining unit 13 determines that the abnormality condition is not satisfied, then the process ends.

In Step 6, the abnormality-signal output unit 15 outputs an abnormality signal.

3. Effect of Collected-Current Monitoring Device 1

(1A) The collected-current monitoring device 1 determines whether the combination of the root mean square (RMS) 1 and the root mean square (RMS) 2 satisfies the abnormality condition. The abnormality condition is satisfied when the root mean square (RMS) 1 and the root mean square (RMS) 2 are unequal, which is when contact loss is occurring. Thus, the collected-current monitoring device 1 is able to determine whether the contact loss is occurring by checking whether the combination of the root mean square (RMS) 1 and the root mean square (RMS) 2 satisfies the abnormality condition.

(1B) The collected-current monitoring device 1 sets the window width W and the abnormality condition depending on the position P and the speed v of the railway vehicle. The collected-current monitoring device 1 is therefore able to optimize the window width W and the abnormality condition depending on the position P and the speed v of the railway vehicle. Consequently, false detection of the contact loss can be reduced while improving sensitivity of detecting the contact loss. The position P and the speed v are both influential factors to the root mean square (RMS) 1 and the root mean square (RMS) 2.

(1C) The collected-current monitoring device 1 is able to set the abnormality condition to be the root mean square (RMS) 1 being equal to or less than the threshold value $A_1$ and the root mean square (RMS) 2 being equal to or greater than the threshold value $B_1$; or the root mean square (RMS) 1 being equal to or greater than the threshold value $B_2$ and the root mean square (RMS) 2 being equal to or less than the threshold value $A_2$.

It is therefore only required to set one or more of the threshold values $A_1$, $A_2$, $B_1$, or $B_2$ to set the abnormality condition. This makes it easy to set the abnormality condition, and also makes it easy to determine whether the combination of the root mean square (RMS) 1 and the root mean square (RMS) 2 satisfies the abnormality condition.

(1D) The collected-current monitoring device 1 comprises a table that defines correspondence between <the position P and the speed v> and <the window width W and the abnormality condition>. The collected-current monitoring device 1 uses this table to set the window width W and the abnormality condition. This helps to easily set the window width W and the abnormality condition. In addition, the correspondence between <the position P and the speed v> and <the window width W and the abnormality condition> can be easily altered by merely changing or rewriting the table.

4. Test for Assessing Effectiveness of Collected-Current Monitoring Device 1

A railway vehicle that comprises the collected-current monitoring device 1 was ran in sections S1, S2, and S3 in this order.

In the section S1, the collected-current monitoring device 1 set the window width W to 50 msec and set the abnormal regions 41 and 43 for determining the abnormality condition as shown in FIG. 7A. In the section S2, the window width W was set to 33.3 msec, and the abnormal regions 41 and 43 for determining the abnormality condition were set as shown in FIG. 7B. In the section S3, the window width W was set to 200 msec, and the abnormal regions 41 and 43 for determining the abnormality condition were set as shown in FIG. 7C.

FIG. 7A shows the detected result of the root mean square (RMS) 1 and the root mean square (RMS) 2 in the section S1. FIG. 7B shows the detected result of the root mean square (RMS) 1 and the root mean square (RMS) 2 in the section S2. FIG. 7C shows the detected result of the root mean square (RMS) 1 and the root mean square (RMS) 2 in the section S3. In all of the sections S1, S2, and S3, false detection of the contact loss was reduced while improving sensitivity of detecting the contact loss.

Meanwhile, comparative tests were conducted with a constant window width W and a constant abnormality condition. The basic testing method is the same as the aforementioned tests. FIG. 8A shows the detected result of the root mean square (RMS) 1 and the root mean square (RMS) 2 in the section S1. FIG. 8B shows the detected result of the root mean square (RMS) 1 and the root mean square (RMS) 2 in the section S2. FIG. 8C shows the detected result of the root mean square (RMS) 1 and the root mean square (RMS) 2 in the section S3. In the section S2, contact loss actually occurred, but could not be detected. In the section S3, contact loss actually did not occur, but the abnormality condition was falsely satisfied.

Other Embodiments

An embodiment of the present disclosure has been described above. Nevertheless, the present disclosure may be modified in various modes without being limited by the aforementioned embodiment.

(1) The information-obtaining unit 17 may be configured to obtain one of the speed v or the position P. In this case, the setting unit 19 may set the window width W and the abnormality condition depending on the obtained information.

Moreover, the information-obtaining unit 17 may obtain a third information in addition to the speed v and the position P. In this case, the setting unit may set the window width W and the abnormality condition depending on the speed v, the position P, and the third information.

(2) The setting unit 19 may be configured to set the window width W, but not the abnormality condition. In this case, the abnormality condition may be a constant condition. The setting unit 19 may be configured to set the abnormality condition, but not the window width W. In this case, the window width W may be, for example, a fixed value.

(3) The setting unit 19 may set a part of the threshold values $A_1$, $A_2$, $B_1$, and $B_2$. Those threshold values that are not set by the setting unit 19 may be fixed, for example.

(4) The abnormality condition may be different from the aforementioned embodiment. For example, the abnormality condition may be represented by R in the following <formula 1> where R is greater than a threshold value X or less than a threshold value Y.

$$R = (\text{root mean square(RMS)2}) / (\text{root mean square (RMS)1}) \quad \text{<Formula 1>}$$

The threshold value X is greater than 1 (one), and the threshold value Y is greater than 0 (zero) and less than 1 (one).

The invention claimed is:

1. A collected-current monitoring device comprising:
   a current-value obtaining unit configured to obtain a current value I1 of collected current flowing through a first current collector, and a current value I2 of collected current flowing through a second current collector;
   a first RMS-calculation unit configured to calculate a root mean square (RMS) 1 of the current value I1 at a window width W;
   a second RMS-calculation unit configured to calculate a root mean square (RMS) 2 of the current value I2 at the window width W;
   a determining unit configured to determine whether a combination of the root mean square (RMS) 1 and the root mean square (RMS) 2 satisfies an abnormality condition;
   an abnormality-signal output unit configured to output an abnormality signal when the determining unit determines that the abnormality condition is satisfied;
   an information-obtaining unit configured to obtain railway vehicle information including at least one of a position or a speed of a railway vehicle that comprises the first current collector and the second current collector; and
   a setting unit configured to set a set-parameter that includes at least one of the window width W or the abnormality condition depending on the railway vehicle information obtained by the information-obtaining unit.

2. The collected-current monitoring device according to claim 1,
   wherein the abnormality condition is that
      one of the root mean square (RMS) 1 or the root mean square (RMS) 2 is equal to or less than a threshold value A, and another one of the root mean square (RMS) 1 or the root mean square (RMS) 2 is equal to or greater than a threshold value B, and
   wherein the threshold value B is greater than the threshold value A.

3. The collected-current monitoring device according to claim 2,
   wherein the setting unit is configured to set the threshold value A and/or the threshold value B.

4. The collected-current monitoring device according to claim 3, further comprising:
   a table that defines a correspondence between the railway vehicle information and the set-parameter;
   wherein the setting unit uses the table to set the set-parameter that corresponds to the railway vehicle information obtained by the information-obtaining unit.

5. The collected-current monitoring device according to claim 2, further comprising:
   a table that defines a correspondence between the railway vehicle information and the set-parameter;
   wherein the setting unit uses the table to set the set-parameter that corresponds to the railway vehicle information obtained by the information-obtaining unit.

6. The collected-current monitoring device according to claim 1, further comprising:
   a table that defines a correspondence between the railway vehicle information and the set-parameter;

wherein the setting unit uses the table to set the set-parameter that corresponds to the railway vehicle information obtained by the information-obtaining unit.

7. The collected-current monitoring device according to claim 1, further comprising:
   a monitor unit configured to display an occurrence of malfunction based on the abnormality signal.

8. The collected-current monitoring device according to claim 1, further comprising:
   a control unit configured to control speed or acceleration of the railway vehicle based on the abnormality signal.

9. A collected-current monitoring device comprising:
   a first current sensor configured to detect a current value I1 of collected current flowing through a first current collector;
   a second current sensor configured to detect a current value I2 of collected current flowing through a second current collector;
   a first RMS-calculation unit configured to calculate a root mean square (RMS) 1 of the current value I1 at a window width W;
   a second RMS-calculation unit configured to calculate a root mean square (RMS) 2 of the current value I2 at the window width W;
   a determining unit configured to determine whether a combination of the root mean square (RMS) 1 and the root mean square (RMS) 2 satisfies an abnormality condition;
   an abnormality-signal output unit configured to output an abnormality signal when the determining unit determines that the abnormality condition is satisfied;
   a monitor unit configured to display an occurrence of malfunction based on the abnormality signal;
   a control unit configured to control speed or acceleration of the railway vehicle based on the abnormality signal;
   an information-obtaining unit configured to obtain railway vehicle information including a position and a speed of a railway vehicle that comprises the first current collector and the second current collector; and
   a setting unit configured to set a set-parameter that includes at least one of the window width W or the abnormality condition depending on the position and the speed of the railway vehicle shown in the railway vehicle information.

10. A method comprising:
   obtaining a current value I1 of collected current flowing through a first current collector, and a current value I2 of collected current flowing through a second current collector;
   calculating a root mean square (RMS) 1 of the current value I1 at a window width W;
   calculating a root mean square (RMS) 2 of the current value I2 at the window width W;
   determining whether a combination of the root mean square (RMS) 1 and the root mean square (RMS) 2 satisfies an abnormality condition;
   outputting an abnormality signal when it is determined that the abnormality condition is satisfied;
   obtaining railway vehicle information including at least one of a position or a speed of a railway vehicle that comprises the first current collector and the second current collector; and
   setting a set-parameter that includes at least one of the window width W or the abnormality condition depending on the railway vehicle information.

* * * * *